United States Patent
Kung et al.

(10) Patent No.: US 7,298,545 B2
(45) Date of Patent: Nov. 20, 2007

(54) HIGH REPETITION RATE VISIBLE OPTICAL PARAMETRIC OSCILLATOR

(75) Inventors: Andrew H. Kung, Taipei (TW); Shining Zhu, Nanjing (CN); Shih-Yu Tu, Xizhi (TW); Zhida Gao, Shen Yang (CN)

(73) Assignee: Academia Sinica, Nankang, Taipei (TW)

( * ) Notice: Subject to any disclaimer, the term of this patent is extended or adjusted under 35 U.S.C. 154(b) by 137 days.

(21) Appl. No.: 11/318,234

(22) Filed: Dec. 23, 2005

(65) Prior Publication Data
US 2007/0147443 A1 Jun. 28, 2007

(51) Int. Cl.
*G02F 1/35* (2006.01)
*G02F 2/02* (2006.01)

(52) U.S. Cl. ...................... 359/330; 356/301
(58) Field of Classification Search ........ 359/326–330; 372/21–22; 356/301
See application file for complete search history.

(56) References Cited

U.S. PATENT DOCUMENTS

| | | | |
|---|---|---|---|
| 6,108,081 A | 8/2000 | Holtom et al. | |
| 6,211,999 B1 | 4/2001 | Gopalan et al. | |
| 2002/0154663 A1* | 10/2002 | Zhu et al. ............... | 372/22 |
| 2007/0127107 A1* | 6/2007 | Kitamura et al. ........ | 359/238 |

OTHER PUBLICATIONS

L.E. Meyers et al., Multigrating quasi-phase-matched optical parametric oscillator in periodically poled $LiNbO_3$, *Optics Letters*, vol. 21, No. 8 p. 591-593 (1996).

J. Mes et al., Single-longitudinal-mode optical parametric oscillator for spectroscopic applications, *Optics Letters*, vol. 27, No. 16 p. 1442-1444 (2002).

H. Liu et al., Aperiodic optical superlattices engineered for optical frequency conversion, *Applied Physics Letters*, vol. 79, No. 6 p. 728-730 (2001).

Kartaloglu et al., Simultaneous phase matching of optical parametric oscillation and second-harmonic generation in a periodically poled lithium niobate, *J. Opt. Soc. Am. B.* vol. 20, No. 2 (2003).

* cited by examiner

*Primary Examiner*—Hemang Sanghavi
(74) *Attorney, Agent, or Firm*—Cohen Pontani Lieberman & Pavane LLP (57) ABSTRACT

A tunable coherent light source includes a pump laser for generating a pump beam and an optical parametric oscillator including a crystal exhibiting an output curve for a pump beam of a defined wavelength, the output curve defining wavelengths of signal and idler outputs based on periodically poled grating periods of the crystal. The crystal has a plurality of segments associated with a plurality of grating periods of the output curve, each segment of the plurality of segments having a different crystal structure. At least one of the plurality of segments comprises a crystal structure combining at least two of the grating periods A heating device heats the crystal to an elevated operating temperature and is adjustable for adjusting the output wavelengths of each of the segments.

25 Claims, 10 Drawing Sheets

| No. | Period (μm) | 130°C signal(nm) | 130°C idler(nm) | 200°C signal(nm) | 200°C idler(nm) |
|---|---|---|---|---|---|
| 1 | 7.8 | 1.064 | 1.064 | 0.909 | 1.283 |
| 2 | 7.98 | 0.910 | 1.280 | 0.859 | 1.398 |
| 3 | 8.16 | 0.860 | 1.394 | 0.825 | 1.499 |
| 4 | 8.35 | 0.825 | 1.499 | 0.798 | 1.597 |
| 5 | 8.55 | 0.798 | 1.596 | 0.776 | 1.692 |
| 6 | 8.74 | 0.776 | 1.694 | 0.757 | 1.789 |
| 7 | 8.94 | 0.757 | 1.790 | 0.741 | 1.886 |
| 8 | 9.14 | 0.741 | 1.885 | 0.727 | 1.982 |
| 9 | 9.35 | 0.727 | 1.984 | 0.714 | 2.084 |
| 10 | 9.56 | 0.714 | 2.085 | 0.703 | 2.188 |
| 11 | 9.77 | 0.703 | 2.187 | 0.693 | 2.293 |
| 12 | 9.98 | 0.693 | 2.291 | 0.684 | 2.400 |
| 13 | 10.2 | 0.683 | 2.402 | 0.675 | 2.516 |
| 14 | 10.42 | 0.675 | 2.517 | 0.666 | 2.636 |
| 15 | 10.64 | 0.666 | 2.636 | 0.659 | 2.761 |
| 16 | 10.86 | 0.659 | 2.759 | 0.652 | 2.892 |
| 17 | 11.08 | 0.652 | 2.889 | 0.645 | 3.029 |

HIGH REPETITION RATE VISIBLE OPTICAL PARAMETRIC OSCILLATOR

BACKGROUND OF THE INVENTION

The present invention relates to a tunable coherent light source comprising an optical parametric oscillator device for the visible and near infrared region based on stoichiometric ferroelectric crystal material as the parametric gain medium pumped by pulsed solid state lasers.

Optical Parametric Oscillators (OPOs) are used as sources of tunable coherent radiation. An OPO includes a non-linear optical crystal and an optical resonator cavity. The non-linear optical crystal converts an input laser wave (referred to as a "pump" beam) into two output waves called the signal beam and the idler beam. The wavelengths of the signal and idler beams are determined by the pump frequency, the angle the pump wave vector makes with respect to a crystal axis of the non-linear optical crystal, and the phase matching properties of the non-linear optical crystal. The optical resonator cavity resonates at least one of the signal and idler beams.

Electric field poling is used to fabricate periodically-poled quasi-phase-matched ferroelectric crystals which are used to produce efficient and compact all solid-state OPOs. However, ferroelectric material is known to be highly susceptible to photo refractive damage and visible-induced infrared absorption such that OPOs using ferroelectric material as the non-linear optical crystal are confined to operating in the infrared region. Near-infrared OPOs using $LiNbO_3$ and $LiTaO_3$ as the non-linear optical crystal are used for low power applications. However, refractive damage limits their further development in high power OPOs. Accordingly, compact high repetition-rate high power OPOs broadly tunable in the visible and near-infrared are still not available.

U.S. Pat. No. 6,211,999 discloses the use of near-stoichiometric $LiTaO_3$ (SLT) with an increased optical damage threshold. Periodically-poled near stoichiometric $LiTaO_3$ (PPSLT) is applied in efficient second harmonic generation and sum frequency mixing to the blue and green regions. However, the devices described in U.S. Pat. No. 6,211,999 also suffer from photo refractive damage and light-induced absorption under intense radiation of >15 $MW/cm^2$. Similar ferroelectric crystals made of MgO doped SLT and MgO doped stoichiometric lithium niobate have similar problems.

OPOs typically include a plurality of periodically poled inverted domain structures, each having a different period. Each section or segment is used to generate different signal and idler wavelengths. Another problem with known periodically-poled crystal devices is that many segments of slightly different periodicity are required to provide a broad continuously tunable range.

Commercially available high power tunable lasers include dye lasers and Ti: sapphire lasers. Dye lasers use chemicals that are potentially toxic and possible cancer agents. Ti: sapphire lasers have a limited tuning range and are difficult to time.

SUMMARY OF THE INVENTION

An object of the present invention is to provide a high power, compact, environmentally friendly, and continuously tunable coherent light source for producing visible and near infrared light.

Another object of the present invention is to provide an optical device comprising the light source of the present invention and an optical system for producing microscopic images by non-linear optical interaction of the light from the light source with an object sample.

The above objects are met by a tunable coherent light source comprising a pump laser for generating a pump beam, and an optical parametric oscillator including a crystal having a crystal structure exhibiting an output curve for a pump beam of a defined wavelength, the output curve defining wavelengths of signal and idler outputs based on periodically poled grating periods of the crystal structure. The crystal includes a plurality of segments associated with a plurality of grating periods of the output curve. Each of the segments has a different domain structure, wherein at least one of the plurality of segments comprises a domain structure combining at least two of the grating periods. The light source also includes a heating element for maintaining the crystal at an elevated temperature. The heating element is adjustable so that the operating temperature is adjustable between a minimum temperature and a maximum temperature. In a preferred embodiment, the crystal is periodically poled near-stoichiometric $LiTaO_3$ (PPSLT) and the heating element heats the crystal to a temperature above approximately 373° K. The combination of grating periods may be effected by an aperiodic structure or a quasi-periodic structure.

The optical parametric oscillator comprises a resonator cavity having a first reflecting element arranged proximate a first side of the resonator cavity and a second reflecting element arranged proximate a second side of the resonator cavity, the crystal being arranged between the first and second reflecting elements.

In one embodiment, the pump beam is directed into the resonator cavity through the first reflecting element, the first reflecting element being a multiple layer dielectric mirror having a high transmissivity T>99.5% at the wavelength of the pump beam and a high reflectivity R>98.5% at the output wavelengths of at least one of the segments. In this embodiment, the second reflecting element is a multiple layer dielectric mirror having a reflectivity in the range of 30-70% at the output wavelengths.

In a further embodiment, the optical parametric oscillator has a third reflecting element arranged between the first reflecting element and the crystal for deflecting and guiding the pump beam through the crystal. The third reflecting element is highly transmitting for a broad range of output wavelengths. In this embodiment, the first reflecting elements may be a silver coated mirror having a very high reflectivity for all wavelengths of the output of the oscillator or a Littrow grating. The second reflecting element may be a crystal with a high refractive index and wavelength independent reflection.

The second reflecting element may alternatively comprise a grazing incidence grating. In this embodiment, the oscillator may further comprise a reflecting mirror arranged for receiving a first order reflection from the grazing incidence grating. A further reflecting element may be arranged so that the second reflecting element is arranged between the further reflecting element and the crystal, the further reflecting element guiding and deflecting the pump beam through the crystal via the second reflecting element.

The output of the optical parameter oscillator is continuously tunable within an output wavelength range of 640 nm to 3000 nm by switching between the plural segments and adjusting the operating temperature of the crystal. The plurality of grating periods includes first through seventeenth grating periods. In one embodiment, the crystal includes nine segments and eight of the nine segments include a combination of two consecutive grating periods. In another embodiment, the crystal include six segment and five of the six segments include a combination of three consecutive grating periods.

The objects of the present invention are also met by a device for obtaining microscopic images of an object including a light source generating an output beam which includes a signal beam and an idler beam, wherein a difference between wavelengths of the signal beam and the idler beam is approximately equal to the Raman wavelength of the object to be imaged, a means for directing the output of the light source to the object, and a detector arranged in front of or behind the object for receiving a signal produced by interaction of the output beam with the object. The light source includes a pump laser for generating a pump beam, and an optical parametric oscillator including a crystal having a crystal structure exhibiting an output curve for a pump beam of a defined wavelength, the output curve defining wavelengths of signal and idler outputs based on periodically poled grating periods of the crystal structure. The crystal includes a plurality of segments associated with a plurality of grating periods of the output curve. Each of the segments has a different crystal structure, wherein at least one of the plurality of segments comprises a crystal structure combining at least two of the grating periods. The light source also includes a heating element for adjustably maintaining the crystal at an elevated temperature.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE
PRESENTLY PREFERRED EMBODIMENTS

Figure 1:
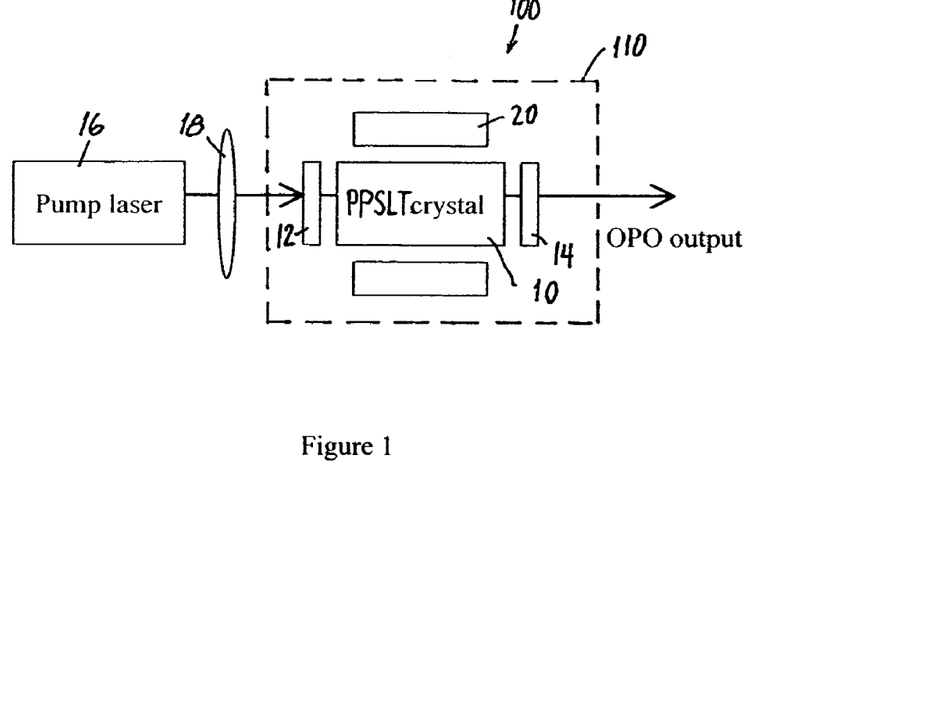
FIG. 1 is a schematic diagram of a light source according to the present invention, having a basic optical parametric oscillator cavity with a PPSLT crystal embedded in a temperature-controlled oven.

An optical parametric oscillator (OPO) 100 shown in FIG. 1 includes a gain medium made from a periodically poled near-stoichiometric $LiTaO_3$ (PPSLT) crystal 10 embedded in an oven 20 or other heating device in an OPO cavity 110. The crystal may alternatively be mode from MgO doped PPSLT. A pump laser 16 generates a pump beam having high repetition rate solid state laser pulses of nano-second scale duration and a repetition rate in the range of 100 Hz-100 kHz. The pump beam generated by the pump laser 16 is directed into the OPO cavity 110 and is focused by coupling optics 18 to provide an intensity below the dielectric damage threshold of the crystal 10 which is approximately 55 $MW/cm^2$. To overcome the problem of photo-induced damage, i.e., photorefractive damage, and visble-induced absorption, the heating device 20 is used to operate the crystal at an elevated temperature of above about 100° C. (for PPSLT).

The OPO cavity 110 in the embodiment of FIG. 1 comprises an input mirror 12 arranged between the crystal 10 and the pump laser 16 and an output minor 14. The input mirror 12 is highly transmitting at the wavelength of the pump laser 16 and preferably has a transmissivity of T>99.5% at the pump laser wavelength. The input mirror 12 is also highly reflective at the output wavelengths (the signal and idler wavelength). The input mirror 12 preferably has a reflectivity of R>98/5% at the output wavelengths. The output mirror 14 is partially reflecting at the output wavelengths. For the pump intensity of <55 $MW/cm^2$ and for an PPSLT crystal length of 2 cm, the reflectivity of the output mirror 14 is preferably in the range 30-70%. Both the input mirror 12 and the output mirror 14 may comprise multiple layer dielectric mirrors. Furthermore, the spacing between the input and output mirrors 12,14 is approximately 3 cm. The arrangement of FIG. 1 can reach approximately 70% output efficiency in photon conversion. However, the mirrors 12,14 in FIG. 1 have a limited useful wavelength range.

Figure 2:
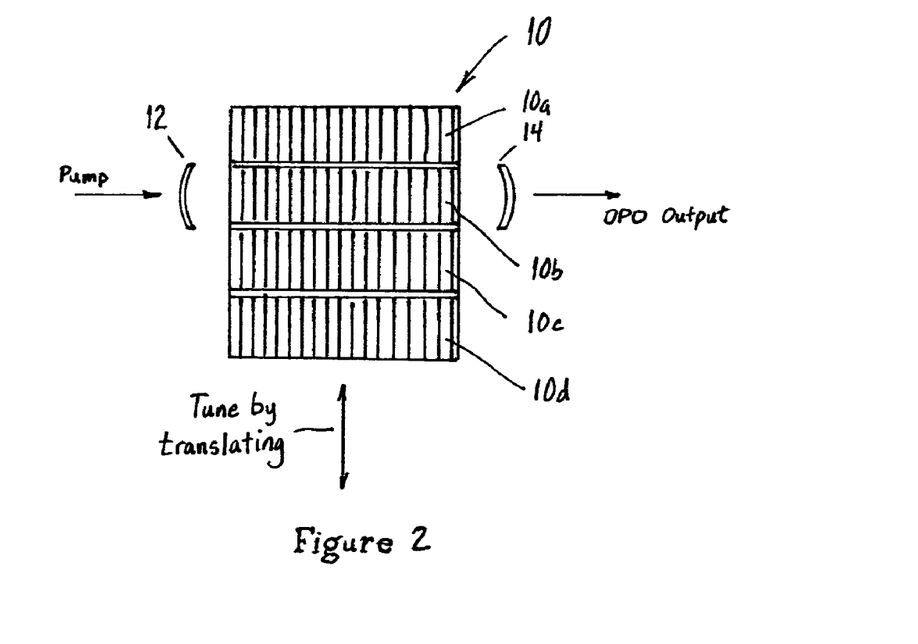
FIG. 2 is a more detailed view of a crystal 10 from the light source of FIG. 1.

Typical PPSLT crystals used for parametric gain devices include a plurality of sections of periodically poled inverted domain structures to produce tuned radiation, each section generating different idler and signal wavelengths. FIG. 2 is a more detailed view of the crystal 10 showing sections 10a-10d. Although four sections are shown in FIG. 2, the crystal may have any number of sections and is limited only by convenience of operation and cost of production. In FIG. 2, the second section 10b is aligned with the input and output mirrors 12,14 and produces the output wavelengths associated with that particular section. The OPO output is tuned by translating the crystal to align a different section 10a-10d with the input and output mirrors 12,14. As will be discussed in more detail below, the output wavelengths of each individual section 10a-10d may also be adjusted by altering the operating temperature of the crystal 10.

Figure 3:
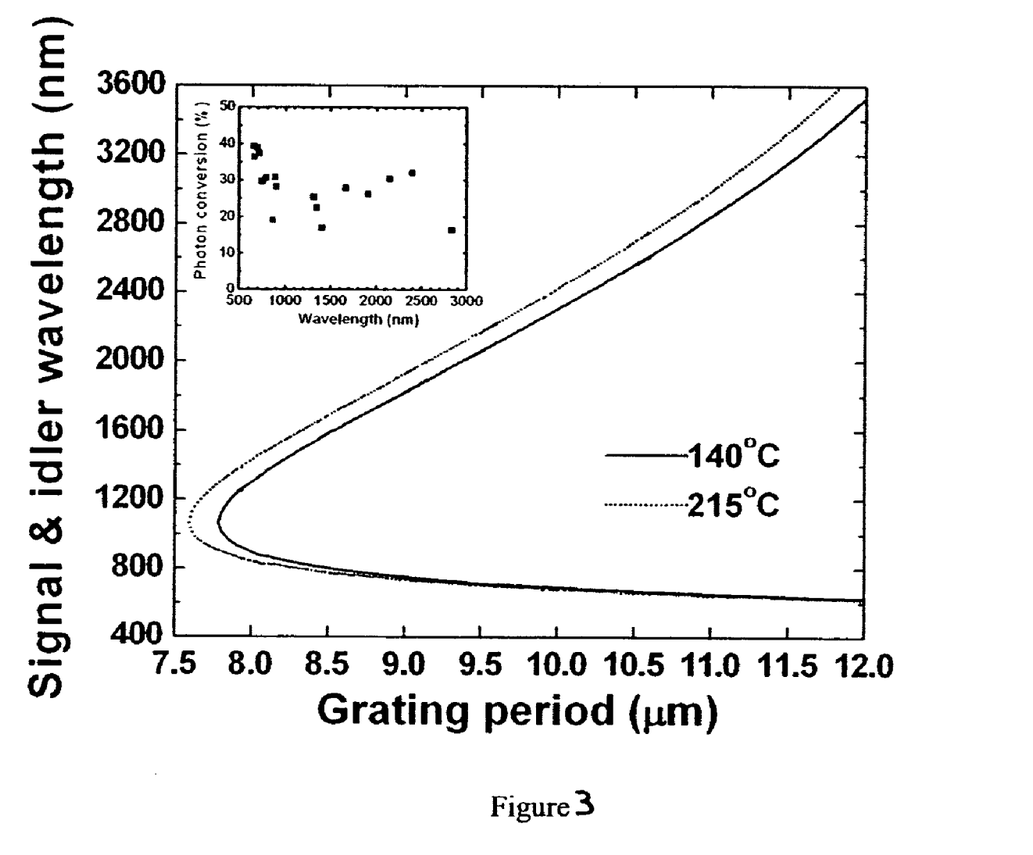
FIG. 3 is a graph showing a tuning curve which illustrates the relationship between crystal temperature and inverted domain periodicity with output wavelength.

FIG. 3 illustrates a tuning curve for an PPSLT crystal for a pump wavelength of 0.532 nm. Each specific grating period has an associated signal and idler output wavelength for the pump wavelength. The signal wavelength is the upper portion of the curve and an idler wavelength is the lower portion of the curve. As indicated in the graph of FIG. 2, the signal wavelength and idler wavelength produced by each segment can be adjusted by adjusting the operating temperature of the crystal 10. However, a large number of segments are required to provide a continuous tuning range.

Figure 4:
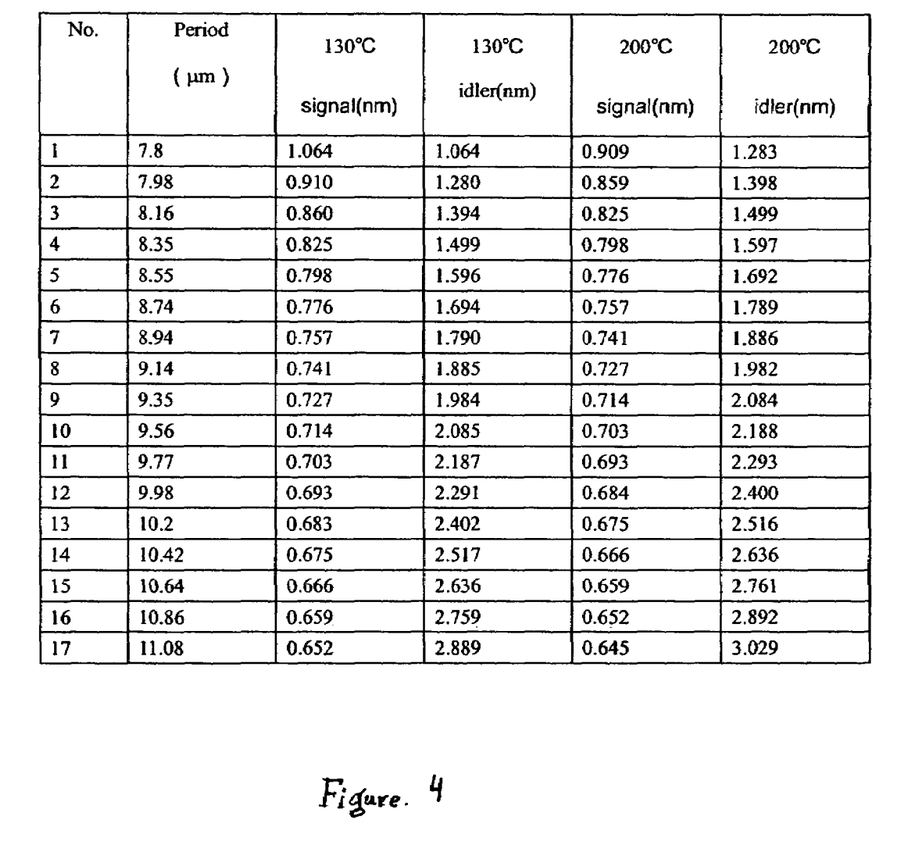
FIG. 4 is a table showing the signal and idler wavelengths of the segments of a crystal according to an embodiment of the present invention.
Figure 5:
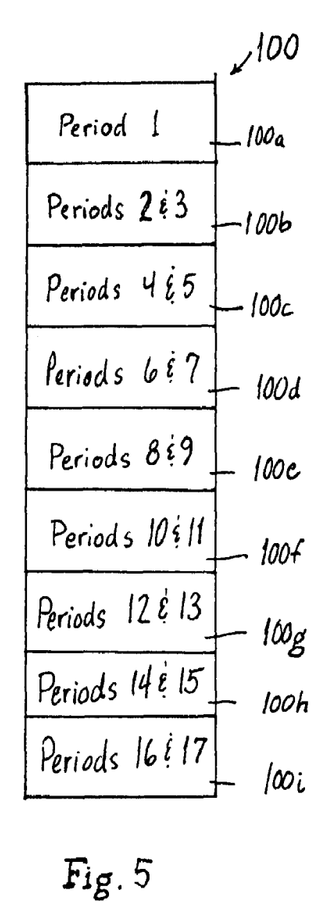
FIG. 5 is a segment of a crystal structure in which two grating periods are combined according to an aperiodic domain structure.
Figure 6:
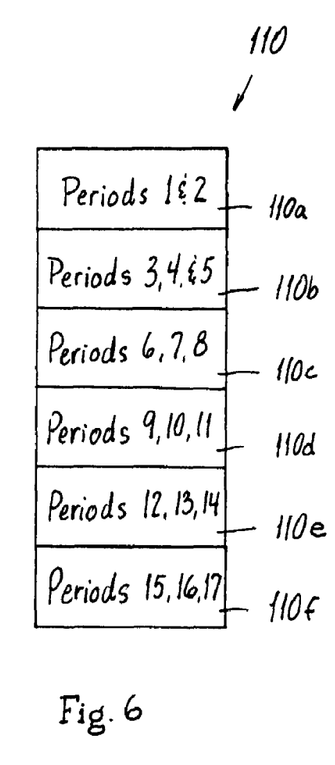
FIG. 6 is a segment of a crystal structure in which two grating periods are combined according to a quasi-periodic domain structure.

FIG. 4 shows a table listing 17 segments of periodically poled domain structures of a crystal which provide a continuous tuning range from 645 nm to 3029 nm with a temperature adjustment of 130° C. to 200° C. Each of the 17 segments includes a structure having a specific grating period. The large number of segments requires frequent switching between segments to achieve the desired output. According to the present invention, the number of domain segments is reduced by combining at least two adjacent grating periods. The method of combining periods in one segment is discussed in further detail below. The reduction in the number of segments facilitates the convenience of operation and reduces the manufacturing cost of the crystal. However, the combining of periods into one segment reduces the gain of the crystal. Accordingly, the amount of reduction in segments must be weighed against the amount of reduction in parametric gain which can be tolerated. Our experience in modeling crystals indicates that combining two or three consecutive periods into one segment provides the most optimal solution. In a first alternative embodiment, each consecutive pair of segments starting with segments 2 and 3 and ending with segments 16 and 17, is combined into one segment to produce a crystal structure 100 as shown in FIG. 5. Segment 1 is left alone in this case because it has sufficiently broad wavelength coverage (i.e., 909 nm to 1283 nm). The crystal structure 100 that has nine segments 100a-100i instead of 17 segments of individual periods. FIG. 6 shows another alternative embodiment of a crystal structure 110 in which three adjacent periods are combined. The total number of segments 110a-110f is reduced to six in this embodiment.

Figure 7:
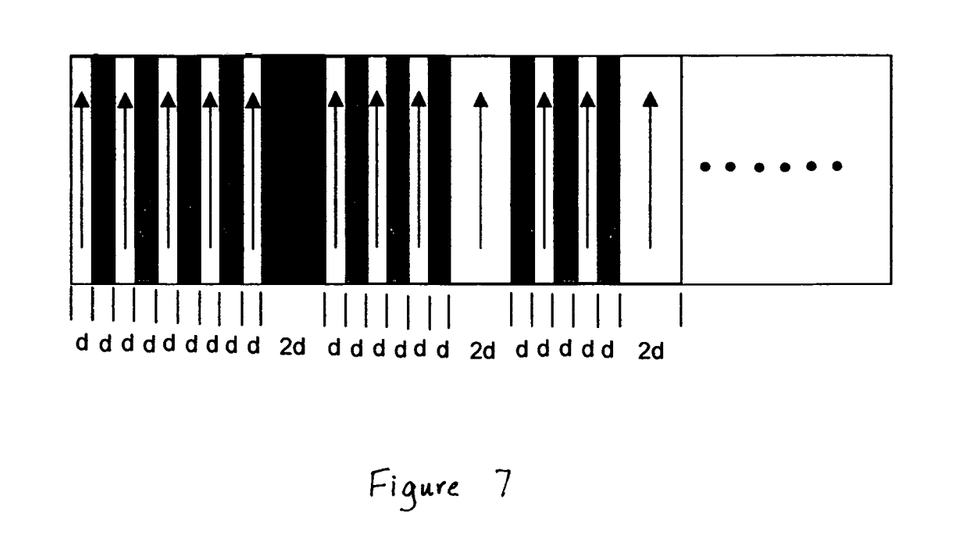
FIG. 7 is a portion of a poled crystal segment combining two consecutive periods of the table in FIG. 4.

There are two methods which may be used to combine consecutive periods into one segment. The first method is referred to as aperiodic structure method and the second method is referred to as quasi-periodic structure method. The following discussion uses the combination of the second and third periods from the table in FIG. 3 as an example. However, the same methods may be used to accomplish the other combinations. The first method is described in detail in the article by T. Kartaloglu, et al., "Simultaneous Phase Matching of Optical Parametric Oscillation and Second-Harmonic Generation in Aperiodically Poled Lithium Niobate", *J. Opt. Soc. Am.*, Vol. 20, No. 2, page 343 (2003), the entire contents of which are incorporated herein by reference. The second and third periods in FIG. 3 to be combined are 8.16 and 7.98 µm. According to Kartaloglu et al., reciprocal vectors $\Delta k_1=0.77=2p/L$ (L=8.16) and $\Delta k_2=0.787367=2p/L$ (L=7.98) are first determined. Fourier components $G(\Delta k_1)$ and $G(\Delta k_2)$ are then maximized. A segment width of 3.5 µm is selected based on experience and an aperiodic pattern of inverted domain distribution is obtained. FIG. 7 shows a segment of the distribution according to the aperiodic structure method.

Figure 8:
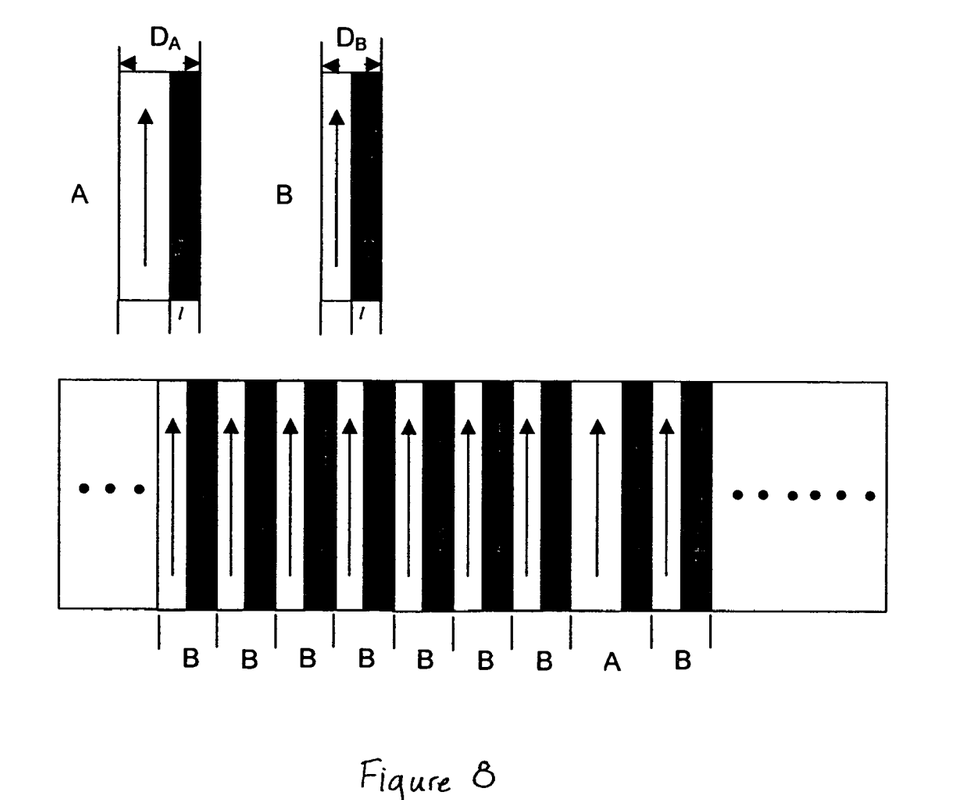
FIG. 8 is a portion of a poled crystal segment combining two consecutive periods of the table in FIG. 4.

The quasi-periodic structure method is described in H. Liu, et al., "Aperiodic Optical Superlattices Engineered for Optical Frequency Conversion", Appl. Phys. Lett. 79, pages 728-730 (2001), the entire contents of which are incorporated herein by reference. According to that reference, the reciprocals for the quasi-periodic structure are $$G_{m,n} = 2\pi \frac{m+n\gamma}{D},$$

where $D=\gamma D_A + D_B$, $G_{1,1}=\Delta k_1$, $G_{1,2}=\Delta k_2$, and $\Delta k_1=0.77$, $\Delta k_2=0.787367$ in our example of combining the second and third periods from the table in FIG. 3. From this one can obtain the structure parameters: $\gamma=0.023075$, $D=8.348272$ µm, $D_A=12.13$ µm, $D_B=8.068$ µm, l=4.03 µm, upon maximizing the Fourier components $G_{1,1}$ and $G_{1,2}$. The corresponding quasi-periodic structure is shown in FIG. 8.

Figure 9:
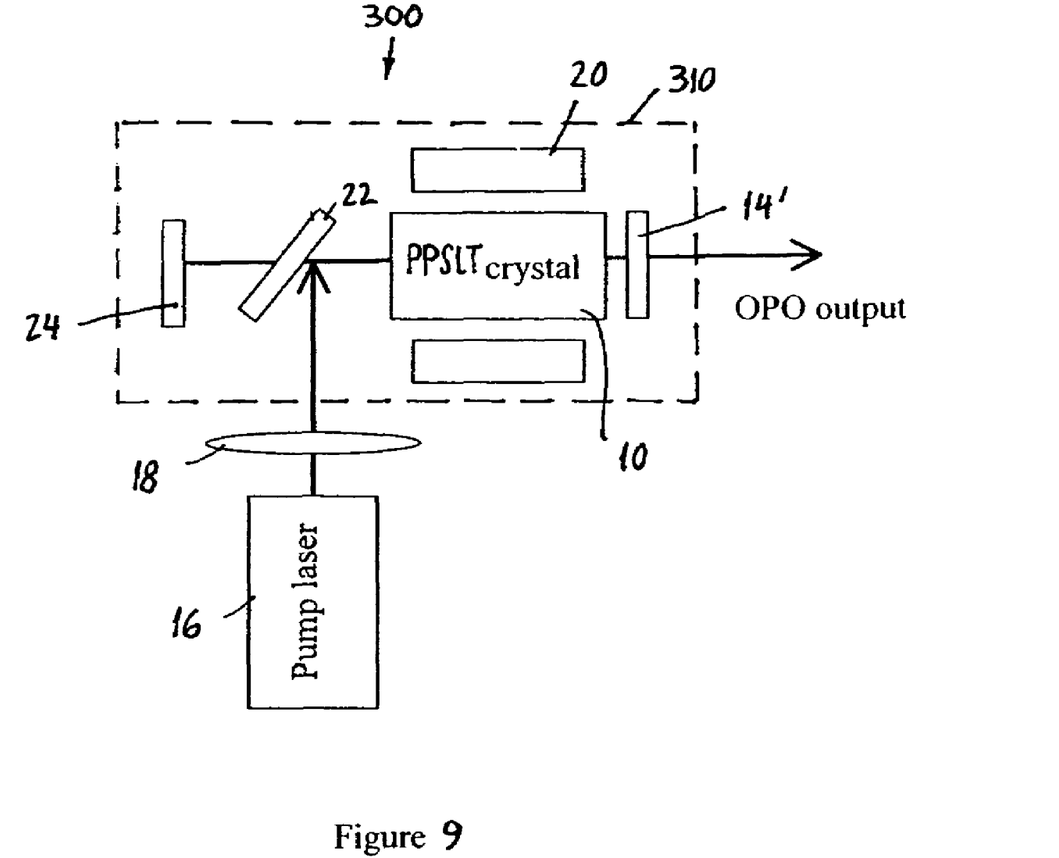
FIG. 9 is a schematic diagram of a compact OPO arrangement for broad tuning application.

FIG. 9 shows an OPO 300 according to a further embodiment of the present invention in which one set of optical mirrors is used for an entire tuning range of the PPSLT crystal 10. The OPO 300 includes an OPO cavity 310 with a dichroic mirror 22 to deflect the pump beam by approximately 90° toward the PPSLT crystal 10. Although the pump beam is deflected by approximately 90° in FIG. 9, the pump beam deflection angle may be any suitable angle that allows the pump beams to clear the components surrounding the OPO 300. The dichroic mirror 22 is highly transmitting for a broad range of output wavelengths. In the embodiment of FIG. 9, a mirror 24 is arranged on one end, i.e., the input end of the OPO cavity 310 and has a silver coating. This mirror 24 has a reflectivity of R>95% for all output wavelengths. In a preferred embodiment, the mirror has a reflectivity of R>99%. At the output end, an output mirror 14' has a crystal with a highly refractive index such that the output mirror 14' has an essentially wavelength independent reflection of $[(n-1)/(n+1)]^2$ on one surface and is broadband anti-reflection coated on a second surface. The arrangement of FIG. 9 is operable for all output wavelengths, i.e., 640 nm-3000 nm, with one set of optics. However, the output power is approximately half of that which is obtainable in the embodiment of FIG. 1.

Figure 10:
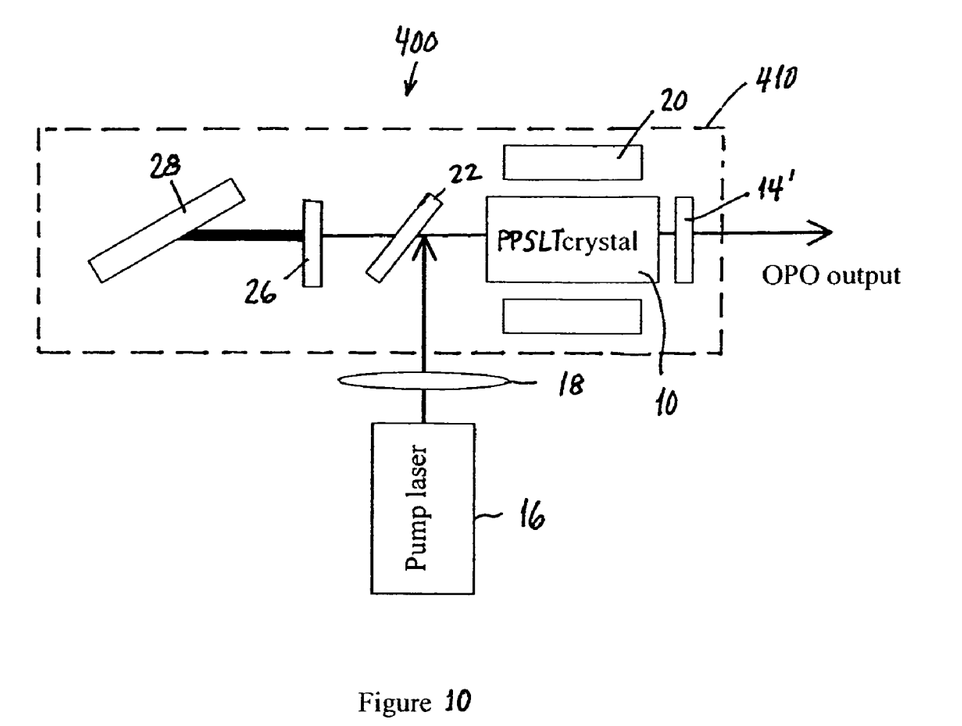
FIG. 10 is a schematic diagram of an optical cavity according to the present invention that provides output with a medium resolution in a wavelength bandwidth.

FIG. 10 discloses an OPO 400 with an OPO cavity 410 according to an alternative embodiment in which the broadly reflecting mirror of the embodiment of FIG. 9 is replaced by a grating 28. A beam expander 26 is optionally-included between the dichroic mirror 22 and the grating 28. In the embodiment of FIG. 10, the grating 28 is set in a Littrow arrangement. The wavelength is set by the setting of the grating 28 and is not affected by the changes in the temperature of the crystal 10. The grating 28 also facilitates a reduction in the bandwidth resolution of the output.

Figure 11:
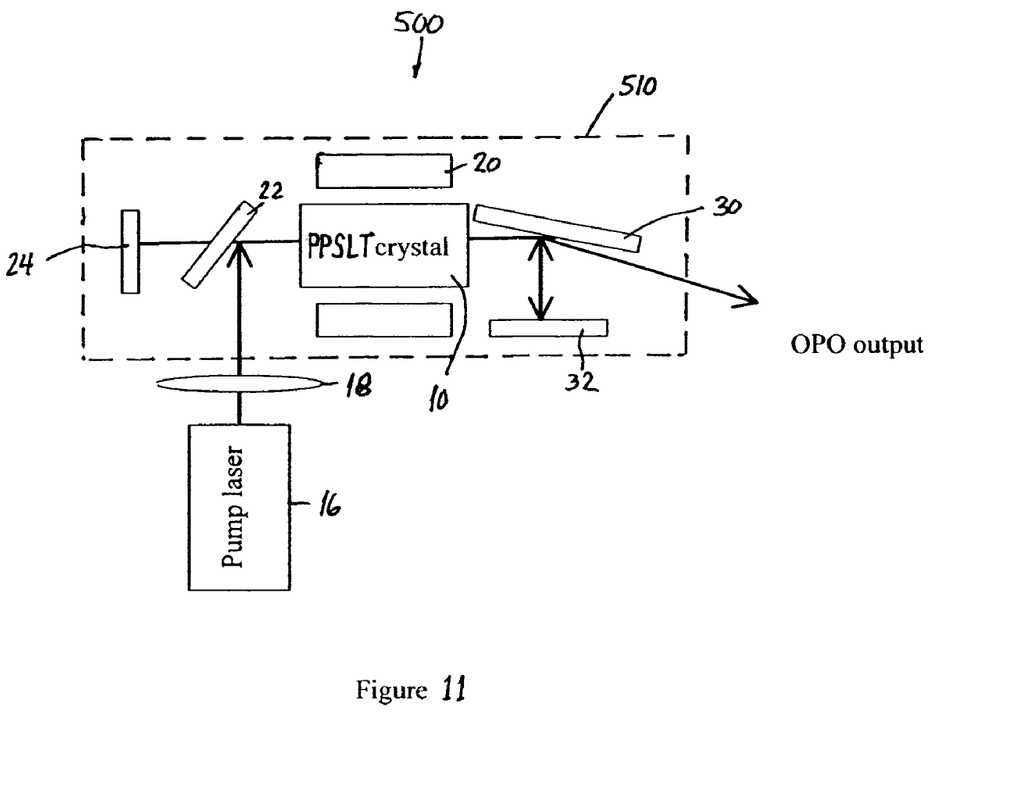
FIG. 11 is a schematic diagram of a optical cavity according to the present invention that provides output with a high resolution in wavelength bandwidth.

FIG. 11 shows another arrangement of an OPO 500 with an OPO cavity 510 in which the output mirror of FIG. 9 is replaced by a grazing incidence grating 30 and a high reflecting mirror 32. The pump beam and output beam exiting the right side of the crystal 10 reflect off of the grating 30 and make an incident angle close to 90°. This arrangement is referred to as a grazing incidence and is described in more detail in U.S. patent application Ser. No. 10/834,755, the entire contents of which are incorporated herein by reference. The beam that is reflected at the angle of incidence exits the OPO cavity 510. Another beam, called the first order reflection, diffracts off the grating and is directed to a reflecting mirror 32, which is adjusted so that the first order reflection reflects onto itself to produce an oscillating action for the OPO 500. The arrangement of FIG. 11 is capable of producing an output having a narrow bandwidth having a width of less than 100 MHz.

Figure 12:
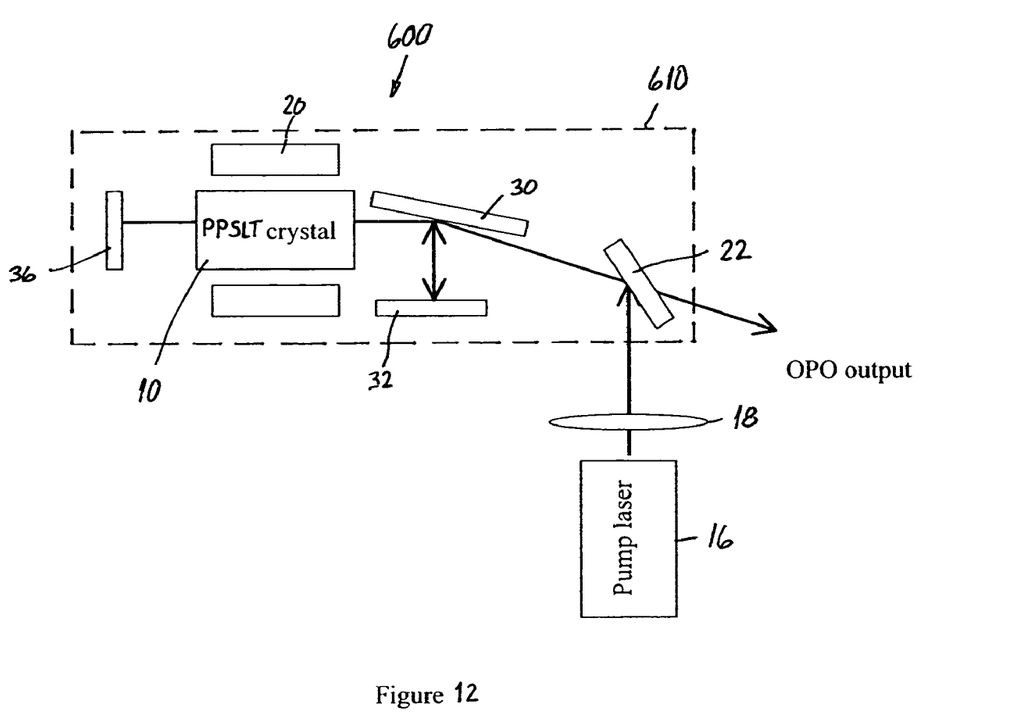
FIG. 12 is a variation of the embodiment in FIG. 8 to provide double passes of the pump beam to reduce the pump threshold.

FIG. 12 is a variation of the embodiment of FIG. 11. A pump beam is fed into the OPO cavity 610 by way of the grazing incidence grating 32. The dichroic mirror 32 is arranged outside of the grazing incidence grating 30 relative to the crystal 10. The reflecting silver mirror 34 of FIG. 11 is replaced by a mirror 36 that is highly reflective (reflectivity>98% or more preferably reflectivity>99%) at the pump wavelength and has a reflectivity R>90% for the range of output wavelengths. In this embodiment, the pump beam passes through the crystal 10 twice which doubles the single pass gain. An advantage of this embodiment is that the pump power requirement is reduced. However, the optical alignment is more difficult than the previous embodiments.

Figure 13:
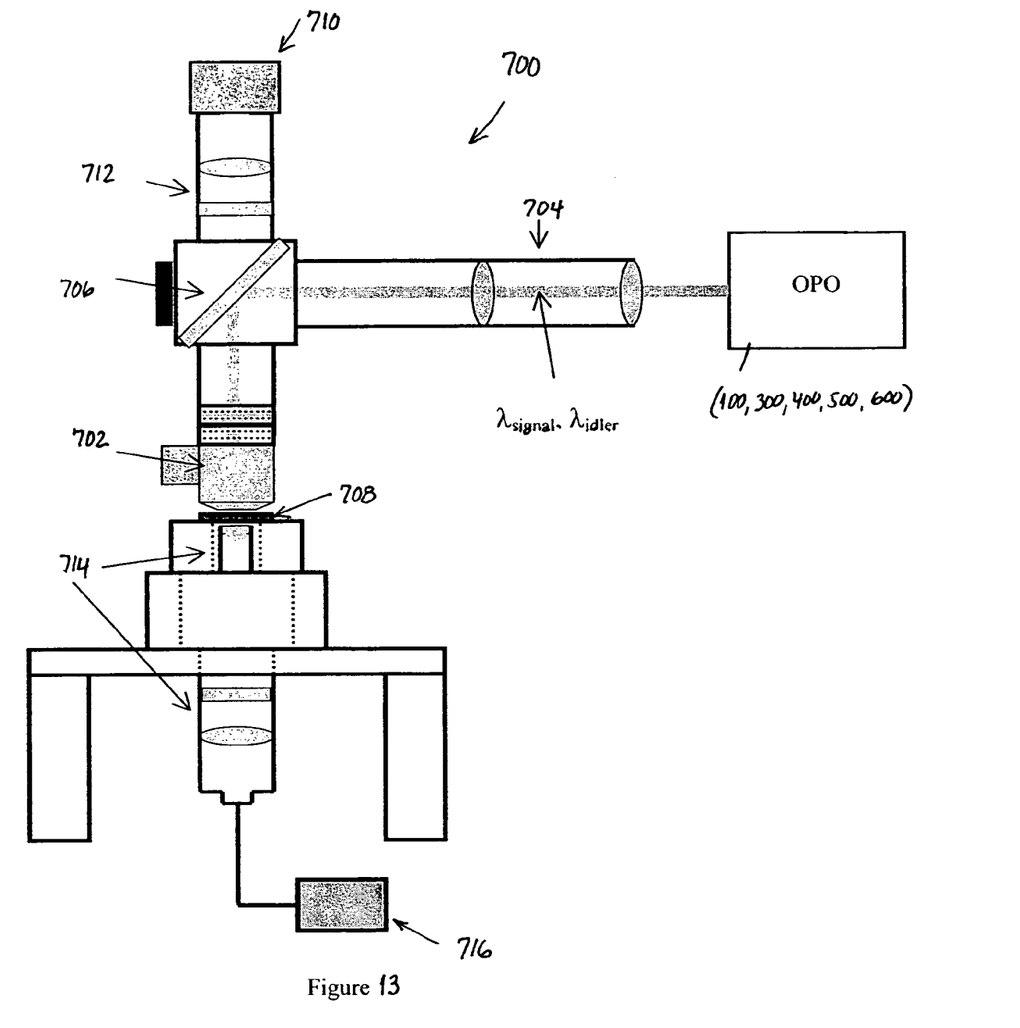
FIG. 13 is a schematic diagram of a microscopic imaging device using a compact visible OPO light source.

The dual output of the OPO 100, 300, 400, 500, 600 is suitable for obtaining microscopic images of an object through non-linear optical interaction of the OPO output with the object to be imaged. In a specific embodiment, the pump laser 16, coupling optics 18, and the OPO cavity 110, 310, 410, 510, 610 according to the present invention is packaged in a single compact platform which is used as a light source for coherent anti-Stoke Raman spectroscopic microscopy (CARS microscopy). In FIG. 13, an output (the signal and idler beams) of OPO 100, 300, 400, 500, 600 is directed into a microscope 700. More specifically, the output of the OPO 100, 300, 400, 500, 600 enters a collimator 704 and reflects off of a dichroic beam splitter 706 toward an objective lens assembly 702 of the microscope which focuses the output beam onto an object 708 to be imaged. In this embodiment, the signal and idler beams are tuned so that the difference in wavelengths of the signal and idler beams is equal to the Raman wavelength of the object 708 to be imaged. An interaction of the output beam with the object 708 produces a CARS signal. The CARS signal reflected backward passes through collection optics 712 which focus the CARS signal onto a photon detector 710. Alternatively or additionally, a photon detector 716 and collection optics 714 may be arranged behind the object 708. By scanning the position of the light on the object 708, a two-dimensional CARS image of the object can be recorded. This process can be repeated for different distances of the object from the objective lens to produce three-dimensional images.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A tunable coherent light source, comprising:
   a pump laser for generating a pump beam;
   an optical parametric oscillator including a crystal exhibiting an output curve for a pump beam of a defined wavelength, said output curve defining wavelengths of signal and idler outputs based on periodically poled grating periods of said crystal, said crystal having a plurality of segments associated with a plurality of grating periods of said output curve, each segment of said plurality of segments having a different domain structure, wherein at least one of said plurality of segments comprises a domain structure combining at least two of said grating periods; and
   a heating device for adjustably heating said crystal to an elevated operating temperature in a temperature range between a minimum temperature and a maximum temperature, said minimum temperature being greater than 100° C., said wavelengths of said signal and idler outputs of each of said segments being adjustable by adjusting said temperature within said temperature range.

2. The tunable coherent light source of claim 1, wherein said optical parametric oscillator comprises a resonator cavity having a first reflecting element arranged proximate a first side of said resonator cavity and a second reflecting element arranged proximate a second side of said resonator cavity, said crystal being arranged between said first and second reflecting elements.

3. The tunable coherent light source of claim 1, wherein said pump beam is directed into said resonator cavity through said first reflecting element, said first reflecting element comprising a multiple layer dielectric mirror having a transmissivity T>99.5% at the wavelength of said pump beam and a reflectivity R>98.5% at the output wavelengths of at least one of said segments.

4. The tunable coherent light source of claim 3, wherein said second reflecting element is a multiple layer dielectric mirror having a reflectivity in the range 30-70% at the output wavelengths.

5. The tunable coherent light source of claim 2, further comprising a third reflecting element arranged between said first reflecting element and said crystal for deflecting and guiding said pump beam through said crystal, said third reflecting element being highly transmitting for a broad range of output wavelengths.

6. The tunable coherent light source of claim 5, wherein said first reflecting element is a silver coated mirror having a reflectivity R>99% for all wavelengths of said output of said optical parametric oscillator and said second reflecting element comprises a crystal with a high refractive index having an essentially wavelength-independent reflection.

7. The tunable light source of claim 5, wherein said first reflecting element comprises a grating.

8. The tunable light source of claim 7, wherein said grating is set in a Littrow arrangement.

9. The tunable light source of claim 7, further comprising a beam expander arranged between said grating and said third reflecting element.

10. The tunable coherent light source of claim 5, wherein said first reflecting element is a silver coated mirror having a reflectivity R>95% for all wavelengths of said output of said optical parametric oscillator and said second reflecting element comprises a grazing incidence grating.

11. The tunable coherent light source of claim 10, further comprising a reflecting mirror arranged for receiving a first order reflection from the grazing incidence grating and reflecting the first order reflection onto itself.

12. The tunable coherent light source of claim 2, further comprising a third reflecting element arranged so that said second reflecting element is between said third reflecting element and said crystal, said third reflecting element deflecting and guiding said pump beam through said crystal via said second reflecting element, said third reflecting element being highly transmitting for a broad range of output wavelengths.

13. The tunable coherent light source of claim 12, wherein said first reflecting element is a dielectric mirror having a reflectivity R>98% at the wavelength of said pump beam and a reflectivity of R>90% for wavelengths of said output of said optical parametric oscillator, said second reflecting element comprising a grazing incidence grating.

14. The tunable coherent light source of claim 13, further comprising a reflecting mirror arranged for receiving a first order reflection from the grazing incidence grating and reflecting the first order reflection onto itself.

15. The tunable coherent light source of claim 1, wherein an output of said optical parametric oscillator is continuously tunable within an output wavelength range of 640 nm to 3000 nm by switching between said plurality of segments and adjusting the operating temperature of said crystal between the minimum temperature and the maximum temperature.

16. The tunable coherent light source of claim 15, wherein said plurality of grating periods of said output curve includes first through seventeenth grating periods, said first grating period being a shortest of said grating periods.

17. The tunable coherent light source of claim 16, wherein said minimum temperature is approximately 130° C. and the maximum temperature is approximately 200° C.

18. The tunable coherent light source of claim 16, wherein said plurality of segments comprises first through ninth segments associated with said seventeen grating periods, and eight segments of said nine segments each include a domain structure combining two successive grating periods.

19. The tunable coherent light source of claim 18, wherein said first segment includes a domain structure associated with only said first grating period.

20. The tunable coherent light source of claim 16, wherein said plurality of segments comprises six segments associated with said seventeen grating periods, five of the six segments each include a domain structure combining three successive grating periods and one segment of said six segments includes a domain structure combining two successive grating periods.

21. The tunable coherent light source of claim 20, wherein said first segment includes a domain structure combining only said first and second grating periods.

22. The tunable coherent light source of claim 1, wherein said crystal is made from periodically poled near-stoichiometric $LiTaO_3$(PPSLT) or MgO doped PPSLT.

23. The tunable coherent light source of claim 1, wherein said at least one of said plurality of segments combines said at least two of said grating periods using one of an aperiodic structure and a quasi-periodic structure.

24. A device for obtaining microscopic images of an object, comprising:
a light source generating an output beam including a signal beam and an idler beam, wherein a difference in wavelength between the signal beam and the idler beam is approximately equal to a Raman wavelength of the object to be imaged;
means for directing the output of the light source to the object; and
a detector arranged in front of or behind the object relative to said output beam for receiving a signal produced by the interaction of the output beam with the object,
wherein said light source comprises a pump laser for generating a pump beam, an optical parametric oscillator including a crystal exhibiting an output curve for a pump beam of a defined wavelength, said output curve defining wavelengths of signal and idler outputs based on periodically poled grating periods of said crystal, said crystal having a plurality of segments associated with a plurality of grating periods of said output curve, each segment of said plurality of segments having a different domain structure, wherein at least one of said plurality of segments comprises a domain structure combining at least two of said grating periods, and a heating device for adjustably heating said crystal to an elevated operating temperature in a temperature range between a minimum temperature and a maximum temperature, said minimum temperature being greater than 100° C., said wavelengths of said signal and idler outputs of each of said segments being adjustable by adjusting said temperature within said temperature range.

25. The device of claim 24, wherein said signal produced by the interaction of the output beam with the object comprises a coherent anti-Stokes Raman spectroscopic (CARS) signal.

* * * * *